United States Patent [19]

Sample

[11] Patent Number: 4,966,491
[45] Date of Patent: Oct. 30, 1990

[54] SUBSURFACE DUNE PROTECTION SYSTEM AND METHOD

[76] Inventor: Jay W. Sample, 2119 Longview Dr., Tallahassee, Fla. 32303

[21] Appl. No.: 388,084

[22] Filed: Aug. 1, 1989

[51] Int. Cl.$^5$ .............................................. E02B 3/04
[52] U.S. Cl. ........................................ 405/19; 405/15; 405/16; 405/21
[58] Field of Search ................................ 405/15–35, 405/91, 115

[56] References Cited

U.S. PATENT DOCUMENTS

| | | | |
|---|---|---|---|
| 864,481 | 8/1907 | Neale | 405/21 X |
| 2,967,398 | 1/1961 | Smith | 405/23 |
| 3,373,568 | 3/1968 | Hornbastel | 405/21 |
| 3,538,711 | 11/1970 | Nielsen | 405/23 |
| 3,640,075 | 2/1972 | La Peyte | 405/23 |
| 3,957,098 | 5/1976 | Hepworth et al. | 405/19 X |
| 4,555,201 | 11/1985 | Paoluccio | 405/21 X |
| 4,690,585 | 9/1987 | Holmberg | 405/18 X |

FOREIGN PATENT DOCUMENTS

| | | | |
|---|---|---|---|
| 2393111 | 2/1979 | France | 405/21 |
| 1254084 | 8/1986 | U.S.S.R. | 405/21 |

Primary Examiner—Dennis L. Taylor
Attorney, Agent, or Firm—Charles R. Engle

[57] ABSTRACT

A Subsurface Dune Protection System making use of a wedge-shaped geotextile container of such size it must be filled with a sand slurry or water in situ. The wedge-shape permits provision of a slope to an upper wave impacting surface for dissipation of wave forces and accretion of sand on a dune surface being protected. The container can be divided into cells so that each cell presents a particular wave impacting surface as the cells increase in height as they progress landward. The cells are formed by walls of impermeable material for filling with water in rapid emergency installations and can later be filled with wet sand as the water is displaced for a permanent installation. The impermeable walls cause the sand to remain wet substantially increasing weight of the container. The substantial length, width and weight of the container provide significant resistance to storm wave forces.

16 Claims, 4 Drawing Sheets

FIG. 4
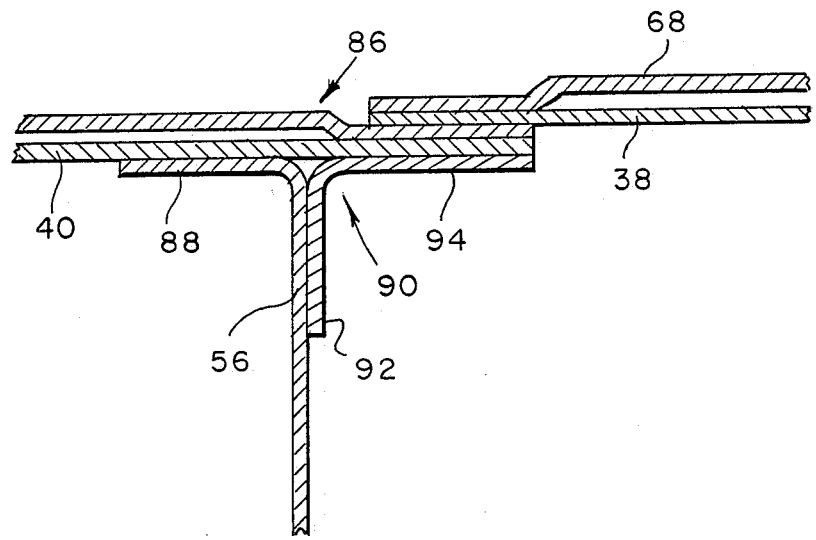
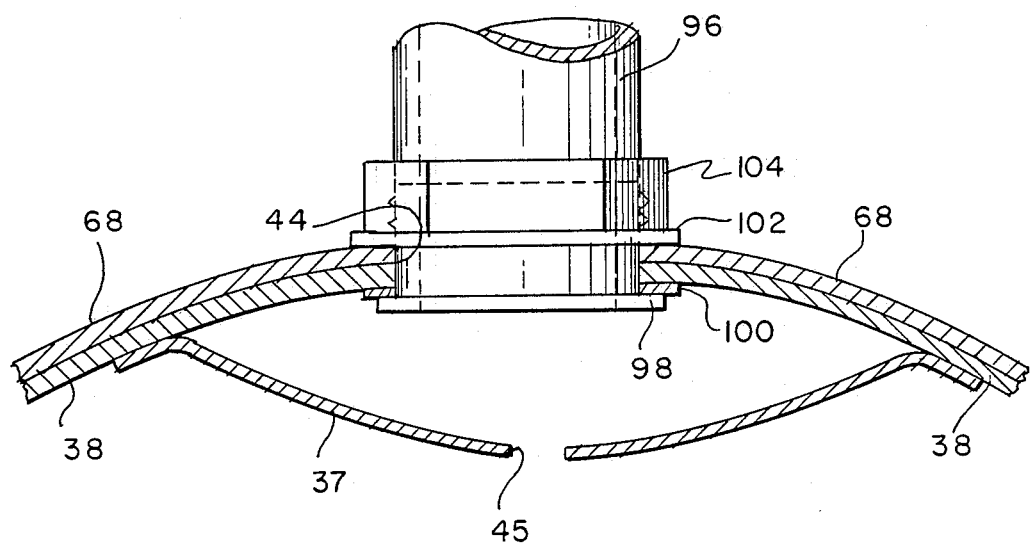
FIG. 5

SUBSURFACE DUNE PROTECTION SYSTEM AND METHOD

FIELD OF THE INVENTION

The present invention relates to an improved beach and dune erosion control system and method of installation. The system utilizes a large water or sand-filled geotextile container which can be of any desired length sufficient to extend along an entire dune surface being protected. Also it can be of any width extending landward a sufficient distance to provide a width and height for specific design protection characteristics. The container is right triangular wedge-shaped in cross-sectional form and includes a plurality of separate internal compartment cells extending the full length of the container along the dune surface. The pointed edge of the wedge is positioned seaward, the flat base of the container is placed upon a smooth excavated dune base surface, and the thick side of the wedge presents a vertical surface adjacent the usual landward and somewhat vertical eroded dune escarpment. The sloping upper wedge surface extends upwardly landward presenting soft revetment surfaces dissipating impacting turbulent wave action in a predetermined manner. In preferred form, the multi-celled geotextile container comprises three cells varying size, each cell extending the length of the container and increasing in height across the container's width landward. The cells are configured to present multiple stair-step somewhat rounded lobed shaped surfaces shore parallel to erosive, impacting, turbulent waves. Incoming wave forces are progressively dissipated as the wave moves upwardly landward on the rounded cell lobe surfaces. An improved method of container installation and filling the individual cells includes placing a deflated container along the dune surface to be protected so that it covers the length and width of the protected surface and pumping either water or sand slurry into prepositioned cell inlet ports until fluid exits an associated relief port. The procedure is repeated along the length of the container until each cell and the entire container is filled. The filled container can be several hundred feet in length and weigh several hundred tons when filled with wet sand. For example, a container 300 feet in length incorporating a three to one slope will weigh Approximately 800 tons when completely filled with wet sand. The weight and possible extreme size of the filled container results in degrees of protection not previously available. Also, the structure of this invention can be placed upon a dune surface and quickly filled with water for temporary protection when advised of an impending storm. After passage of the storm, the temporary protection is readily converted to permanent protection by displacing the water with sand.

DESCRIPTION OF THE PRIOR ART

Conventional attempts to regulate and prohibit beach and dune erosion usually involve installation of wood, steel, or concrete vertical seawalls; installation of a plurality of piles in close contact to form a wall, or the positioning of large rocks or interlocking concrete blocks upon the surface to be protected forming what is known as a hard revetment. These types of rigid shoreline structures have several disadvantages in that after a period of time the desired result is not obtained. Eventually high seas, wave attack and storm weather conditions will simply result in a test of whether the vertical seawall or rocks are capable of providing a sufficient resistive force to continue to reflect the wave action. Quite frequently storm forces are superior and the seawalls are breached or dislodged or the rocks are scattered about a recreational beach surface causing undesirable aesthetic appearances as well as failing to prevent erosion in a particular beach area. A particular disadvantage of a rigid vertical seawall is that after continual wave induced toe scour erosion against the wall and around the wall, the waves are eventually successful in undermining the lower edge of the wall causing the wall to topple over, or they are capable of working around the ends of the wall and getting behind the wall such that the wall is breached or dislodged and is ineffective as a wave force obstructing device. Likewise, a rock revetment generally results in serious accelerated erosion around the ends of the area covered by the rocks and in a manner similar to that occurring with a vertical seawall, the settling or dislodged rocks become ineffective to prevent erosion in the desired area. In addition, documented evidence of a global nature indicates that utilization of vertical seawalls or hard revetments can result in serious erosion of both the sandy recreational beaches fronting the structure as well as on the adjoining coastal properties at each end of the area that is attempted to be protected, because of the reflected wave action and accelerated wave wash around the ends of those inordinately hard surfaces in a soft sandy beach environment.

SUMMARY OF THE INVENTION

In view of the foregoing, a primary object of this invention is the provision of a Subsurface Dune Protection System employing a unitary geotextile container designed to extend a substantial distance along a dune surface being protected providing single container lengths and weights of erosion protection heretofore unknown.

Another object of this invention is the provision of a Subsurface Dune Protection System utilizing deflated geotextile containers that can be placed in the area to be protected and filled with fluid in situ permitting use of extremely large containers in a manner heretofore unknown.

A further object of this invention is the provision of a Subsurface Dune Protection System providing temporary and rapid protection by placing a deflated geotextile container having a substantial length and width upon dune surface and inflating it water upon notice of an impending storm.

A still further object of this invention is the provision of a dune protection system including a geotextile container that can be inflated with water providing temporary protection and later be filled with wet sand displacing the water for permanent protection.

An object of this invention is the provision of a Subsurface Dune Protection System providing a relatively soft, gently sloping, stepped, permeable wave impact surfaces, gradually dissipating wave forces in a manner preventing beach and dune erosion.

Another object of the invention is the provision of a flexible revetment presenting a soft wave impacting surface effective to reduce the erosive velocity of impacting waves and facilitate the deposit of waveborne sand particles upon the upper surface of the shore protective structure.

A further object of the invention is the provision of a dune protection system preventing dune erosion by controlling turbulent wave action in a way that sand is eventually restored to previously eroded areas.

A still further objective of the invention is the provision of a dune protection system presenting particular predetermined soft wave impacting surfaces dissipating the force of storm waves during severe high water conditions.

Yet another object of this invention is the provision of a Subsurface Dune Protection System having a predesigned wave absorption surface, which ascends as the system is installed landward so that the impacting waves are deterred in a predetermined predictable manner preventing dune erosion.

A further object of the invention is the provision of a Subsurface Dune Protection System installed underneath a beach and dune surface and being effective to prevent dune erosion while not normally being visible in the area protected.

Another object of the invention is provision of a Subsurface Dune Protection System that is readily installed without adversely affecting the natural appearance and function of the sandy recreational beach in an area protected by the restoration system.

A still further object of the invention is the provision of a Subsurface Dune Protection System utilizing a minimum of structural devices thus reducing interference with the aesthetic appearances of the protected beach area.

A still further object of the invention is the provision of a Subsurface Dune Protection System including components formed in a way that recreational use of the particular beach area is not interfered with although the system may infrequently become partially exposed.

Another object of the invention is the provision of a geotextile erosion control container including an outer layer of shielding material on its wave impacting surfaces deterring puncture of the geotextile container when debris is washed ashore.

A further object of the invention is the provision of a space between the container outer shielding layer and the upper impervious layer of geotextile material forming the container which can be permitted to be filled with sand and water by wave action or be filled with a cushioning material further resisting puncture by debris washed ashore.

Another object of the invention is the provision of a toe tube attached to the seaward pointed edge of the wedge-shaped container deterring wave under cutting of the container pointed edge.

A still further object of the invention is the provision of a geotextile container having all fabric seams structured to provide shear resistance to separating forces.

Additional objects and advantages of the invention will be set forth in part in the description which follows, and in part will be obvious from the description or may be learned by practice of the invention. The objects and advantages of the invention may be realized and obtained by means of the instrumentalities in combinations particularly pointed out in the appended claims.

The foregoing objects of the invention are achieved by first excavating a base surface, when time permits in a non-emergency situation. A deflated geotextile container including three internal cells, each increasing in height as they progress landward, is placed upon the excavated surface in a shore parallel relationship. A plurality of fluid inlet ports are provided in each cell compartment of the geotextile container. The inlet ports connect with an interior fluid conducting manifold extending the length each cell. The manifold contains a plurality of discharge holes for uniformly filling the cell with wet sand. A fluid pumping system can be readily connected to any one of the inlet ports and depending upon pressure and volume capacities of the system, a particular length of a cell will be filled until fluid exits a specific relief port. The pumping connection is then changed to a downstream location and further filling of the cell is accomplished. The process is repeated until the cell is filled and the pumping system is connected to another cell. The process is continually repeated until all cells and the container is filled. When filled container walls forming the respective cells assume a curved somewhat elliptical shape effective to dissipate impacting wave forces. The pumping inlet fittings are removed and the inlet and relief ports are sealed completing placement of the erosion protection structure. The structure is covered with sand aesthetically finishing the project.

The accompanying drawings, which are incorporated in and constitute a part of the specification, illustrate the preferred embodiment of the invention and together with the description, serve to explain the principles of the invention.

BRIEF DESCRIPTION OF THE DRAWINGS

FIG. 4 is a fragmentary plan view illustrating a preferred form of welded seams utilized in construction of the geotextile container placing major portions of separating forces in shear stress.

FIG. 5 is a fragmentary plan view of strap restraint systems attached to a crest anchor tube and one fluid transfer tube showing distribution of forces across the length of the crest anchor tube.

DESCRIPTION OF THE PREFERRED EMBODIMENT

Reference will now be made in detail to the present preferred embodiment of the invention, an example of which is illustrated in the accompanied drawings.

Figure 1:
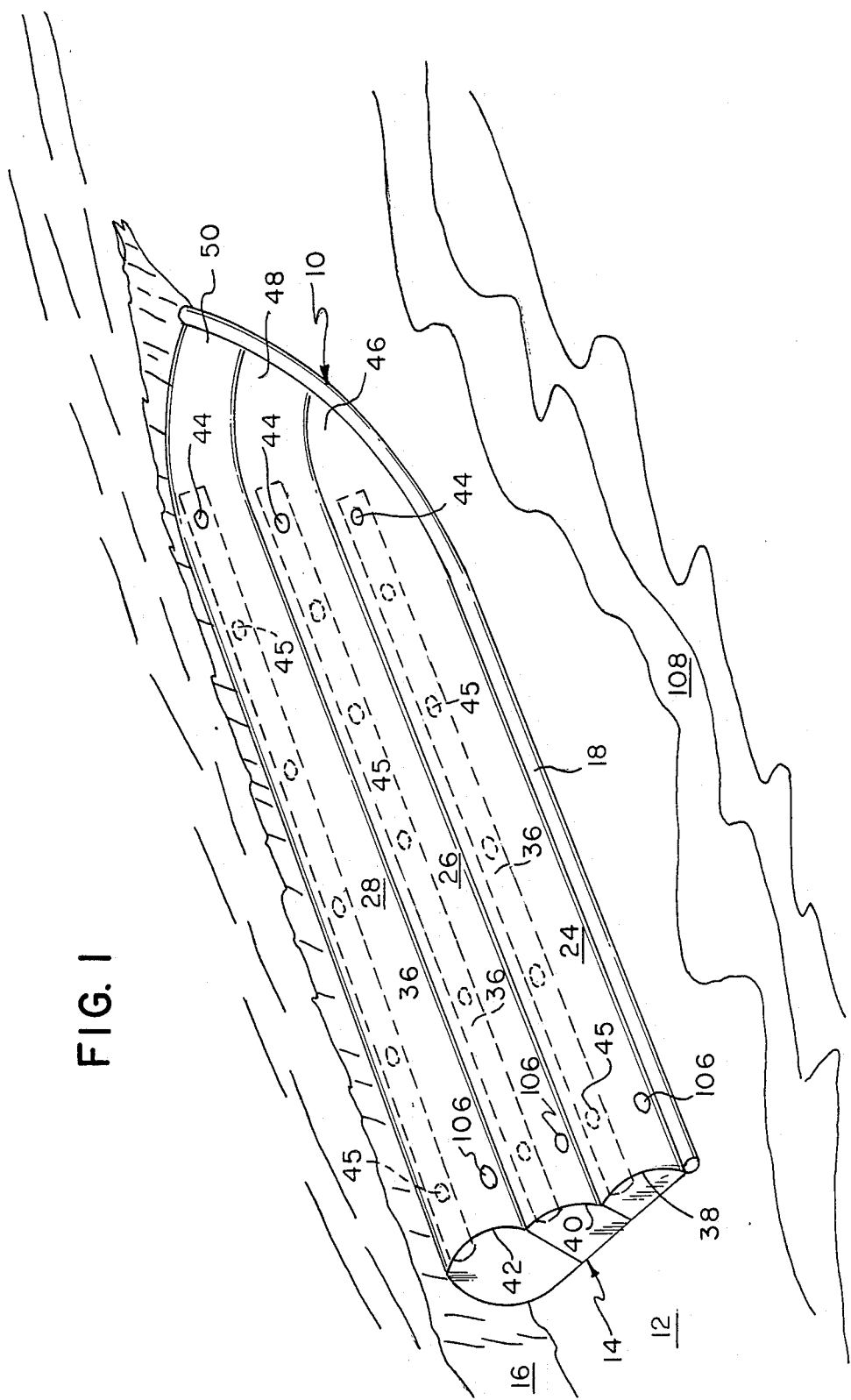
FIG. 1 is an perspective view illustrating a Subsurface Dune Protection System installed in accordance with provisions of the invention.
Figure 2:
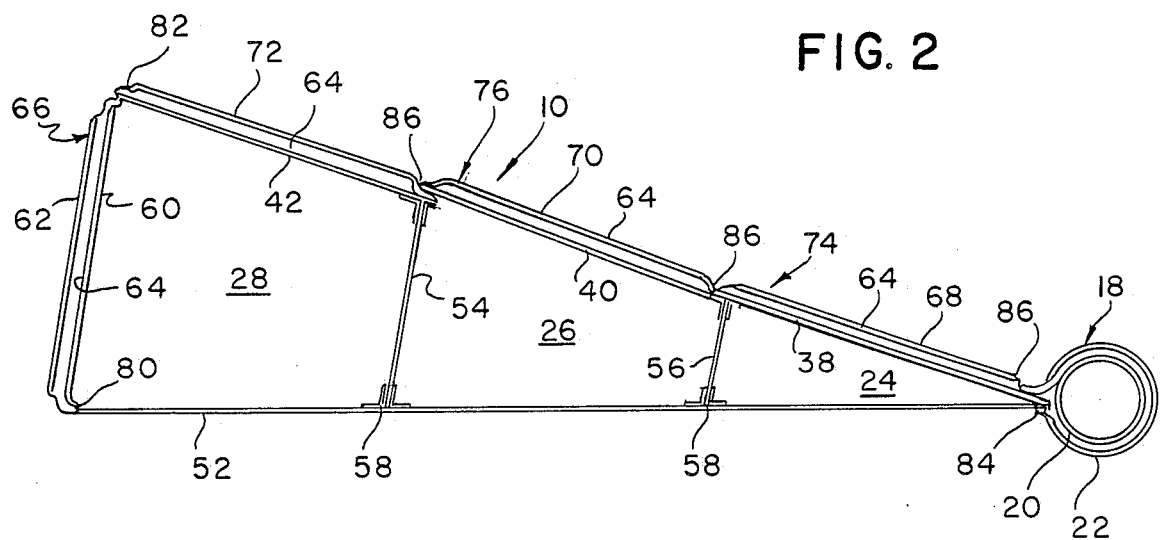
FIG. 2 is a cross-sectional view of an empty geotextile container positioned to show the toe tube and the shape of the cells prior to filling with wet sand.

The preferred embodiment of the Subsurface Dune Protection System of my invention includes a geotextile container 10 as shown in FIG. 1. A dune surface 12 is prepared to provide a base surface 14 adjacent eroded escarpment 16. The container 10 is positioned with an attached or integral sand filled toe scour tube 18 in a seaward position. Toe scour tube 18 can be formed of a rolled section 20 of impervious geotextile material and be covered with a second layer of shielding material 22 as shown in FIG. 2. More specifically, toe scour tube 18 is attached to seaward container cell 24, which in combination with cells 26 and 28 complete the structure of container 10. Each of the cells present curved somewhat elliptical convex surfaces 30, 32, and 34, which rise in height with an increase in distance landward. Also, each cell contains a fluid conducting manifold 36 secured to the inner surface of their respective curved upper walls 38, 40, and 42. The manifolds 36 can be formed by securing a sheet 37 of geotextile material to inner walls 38, 40, and 42 formed of fluid impervious material. A plurality of inlet ports 44 can also be positioned in the walls in alignment with the manifold for filling the respective cells with wet sand. The manifold sheet 37 contains a plurality of discharge holes 45 evenly distributing wet sand within the cells to the extent permitted by the available pump pressure and volume capacity of the pumping system. Ends 46, 48 and 50 of the cells 24, 26, and 28 are tapered downward, as shown in FIG. 1 for a purpose later to be described.

With reference now to FIG. 2, an empty container 10 shown in an unstressed unfilled condition. A base 52 has internal divider walls 54 and 56 attached at heat welded joints 58. An end wall 60 has a protecting shield layer 62, of relatively heavier gauge permeable geotextile material than that used for the inner walls, welded thereover with a space 64 therebetween forming a double walled panel. Inner walls 38, 40, and 42 also have a protecting shield layer 68, 70 and 72 welded thereover providing similar spaces 64 therebetween and forming double walled panels 74, 76, and 78. The base 52, internal dividers 54 and 56, toe scour tube 18 and panels 66, 74, 76, and 78 are secured together by welded joints 58, 80, 82, 84 and 86.

Figure 3:
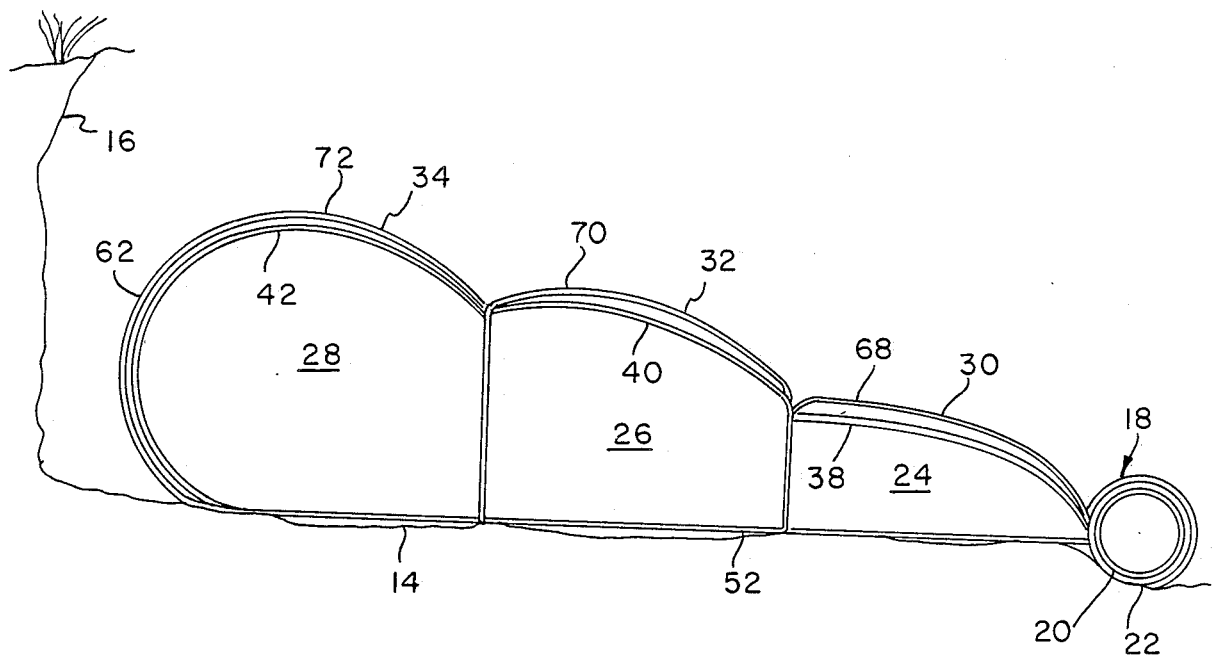
FIG. 3 is a cross-sectional view of a filled geotextile container illustrating the curved form of the outer and upper cell surfaces for dissipating impacting wave forces.

FIG. 3 illustrates configurations of cells 24, 26 and 28 when filled with wet sand. Each of the cells expand outwardly forming the convex wave impacting surfaces 30, 32, and 34 mentioned in reference to FIG. 1.

Referring to FIG. 4, a preferred form of a welded seam is shown. Inner walls 38 and 40, both formed of impermeable geotextile material, have outer shield layers 68 and 70, both formed of permeable relatively heavier gauge geotextile material, welded respectively thereto. Internal divider wall 56 includes a bent tab 88 engaging and being welded to inner surface of wall 40. A strip of geotextile material 90 includes tabs 92 and 94 bent at a right angle, the tabs respectively engaging and being welded to divider wall 56 and the inner surface of wall 40. A significant feature of these welded seams is that all separating forces are resisted in "shear" as distinguished from a "peal" resistance.

With reference to FIG. 5, inlet port 44 is cut into layers 38 and 68 at a specified location. A polyvinylchloride pipe fitting 96 having a gasket seal 100 fitted against a flange 98 is inserted within port 44. A second gasket 102 is fitted over the pipe fitting 96 and pressed against the upper surface of protect shield layer 68. A quick coupling nut, of conventional design is tightened against the gasket 102 connecting fitting 96 for transmission of a wet sand slurry into cell 24. The slurry is pumped into manifold 36 until fluid exits a relief port 106, shown in FIG. 1, indicating a section of the cell is properly filled. Nut 104 is loosened and attached at another port 44 and the process is repeated until the cell is filled. The inlet ports 44 and relief ports 106 are then covered with glued patches and the cell is ready to receive impacting waves from the surf 108.

Figure 6:
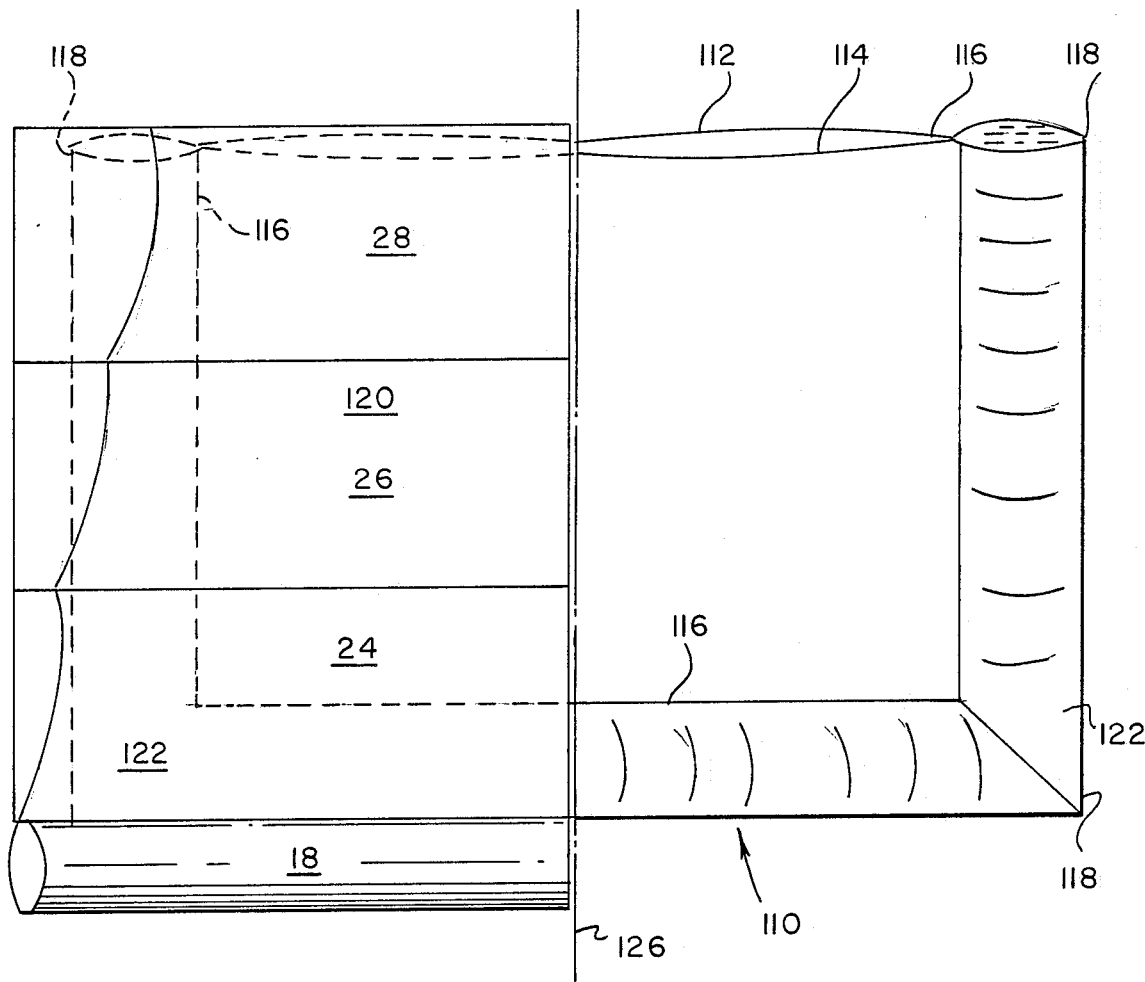
FIG. 6 is a fragmentary cross-sectional view of a pumping connection to a cell inlet port for filling the cell with wet sand.

FIG. 6 illustrates a mattress assembly 110 for sealing junctions when it is necessary to use two or more container assemblies. The mattress 110 is formed by use of two layers of geotextile material 112 and 114 welded together at seams 116 and 118 forming a flat central base section 120 surrounded on three sides by a U-shaped tubular section 122. The tubular section 122 is filled with sand forming a front barrier 124 at the base of the "U" which is positioned immediately landward of the toe scour tubes 18.

The two container assemblies 10 are placed to abut end to end at the centerline 126 with their respective toe tubes 18, cells 24, 26 and 28 all in contact on the mattress assembly 110. The tubular section 122 acts to seal the abutting joint behind the toe tubes 18.

Spaces 64 between the protect shield layers 68, 70 and 72 enhance protection of the impermeable layers 38, 40 and 42 in that the space can be filled with any known weather resistant fiber cushioning material or be left empty. The shield layer is preferably of a rather thick but porous geotextile material. Consequently, it has been found that it is likely sand will collect in the spaces 64 so that further puncture resistance is provided for the inner layers 38, 40 and 42.

After the Subsurface Dune Protection System is installed according to the previous description, a predetermined quantity of compatible sand fill is distributed over the entire system. The sand fill is contoured into a gently sloping beach and dune surface which may be planted with appropriate vegetation to assist in the stabilization of the fill material. The finished dune restoration and revegetation project atop the previously emplaced erosion control system allows for the full recreational use of the naturally appearing beach and dune areas, while providing substantial levels of storm protection hidden below.

A significant feature of the subject structure is the concept of filling a very large container in situ. The ability to place the empty structure at a specified location and fill it with hundreds of tons of water and sand affords a degree of erosion protection heretofore unavailable.

As can be readily seen and appreciated from the above description, the Subsurface Dune Protection System presents a relatively soft, stepped, wave absorptive surface, which is designed to gradually dissipate the force of waves impacting the beach and dune areas along the shorelines.

It is significant that a wave will first contact the seaward curved surface 30 of cell 24 and will continue upward engaging similar surfaces 32 and 34 of cells 26 and 28 as can be appreciated from FIG. 1. As the wave impacts surface 30 and continues upwardly against gravity, across the subsequent cell surfaces wave force and velocity is gradually dissipated. Each surface functions as a flexible wave tripping device producing water particle rotation and tumbling, thereby dissipating wave uprush in a manner similar to the phenomena of near shore waves cresting and breaking over natural reef structures.

It is known that wave action is an orbital rolling action as it impinges against a beach or dune surface and by interfering with this orbital rolling action in a series of stages or steps, the wave's force and velocity is gradually decreased, thus minimizing erosion.

As wave velocity decreases by impacting upon the successive cell surfaces waveborne sand particles carried in suspension by the water velocity begin to settle out of suspension onto the upper surface of the container structure and produce natural accretion process. Consequently, this invention is extremely significant in that it takes advantage of the natural phenomena of potentially millions of cubic yards of waveborne sand particles in suspension within the littoral system and near shore wave action normally impacting upon a beach and dune surface, and does so through the utilization of a relatively simple system working in harmony with nature.

Movement of the container is greatly inhibited by the combined size and weight of the three cells in the preferred embodiment, for example, a 300 foot unit will weigh approximately 800 tons.

Upon reaching the extremities of the project area in a shore parallel direction, the Subsurface Dune Protection System preferably is swept gradually landward over a graceful curve or arc, such as by curving cell end portions 46, 48 and 50 illustrated in FIG. 1. This minimizes the effects of the structure's existence on adjacent coastal properties. Right angles, such as vertical return walls on conventional hard erosion control structures are infamous for creating accelerated erosion on neighboring waterfront properties and are to be avoided. The graceful, wide, curving returns indigenous to the gently sloping Subsurface Dune Protection System design eliminates the turbulent rotor currents normally associated with abrupt right angle vertical return structures. Gentle, flowing curves assure the greatest possibility of maintaining a more linear hydrodynamic flow of shore parallel current during severe storm surge conditions.

It will be apparent to those skilled in the art that various modifications and variations can be made in the Subsurface Dune Protection System of the present invention without departing from the scope or spirit of the invention. Thus, it is intended that the present invention cover the modifications and variations of this invention provided they come within the scope of the appended claims and their equivalents.

What is claimed is:

1. A subsurface dune protection system comprising a generally wedge-shaped single inflatable container capable of being deployed on a dune surface being protected in a deflated condition; said container being substantially right triangular in cross-section with a generally horizontal base wall, a generally vertical back wall positioned adjacent a dune escarpment, and an upper sloped wave impacting wall sloping downwardly seaward connecting with said base surface at the wedge cutting edge; internal divider walls separating said single container into a plurality of separate cells extending parallel to one another and parallel to the adjacent shoreline; said container and said cells extending a substantial distance along the shoreline; a first of said cells being positioned at the wedge cutting edge and defining a first portion of said sloping wall; each additional said cells increasing in height defining higher portions of said sloping wall as they progress landward; and a toe scour tube attached to the cutting edge and extending parallel the full length of said container; said toe scour tube preventing wave undercutting of said wedge cutting edge; said cell sloping walls being convex curved when said cells are inflated by filling with wet sand.

2. A subsurface dune protection system as described in claim 1 wherein said container and said cells contained therein extend several hundred feet along the dune being protected.

3. A subsurface dune protection system as described in claim 1 wherein said cells are defined by walls of impermeable geotextile material.

4. A subsurface dune protection system as described in claim 3 wherein a layer of relatively heavy gauge geotextile shielding material is secured over said vertical back surface walls and said upper sloping surface walls, said layers of shielding geotextile material deterring wave impacted debris from said puncturing impermeable material defining said cells.

5. A subsurface dune protection system as described in claim 4 wherein a space is provided between said upper sloping surface walls and said layer of shielding material, said space providing further protection to said upper sloping surface wall from puncture.

6. A subsurface dune protection system as described in claim 5 wherein said space is filled with a weather resistant cushioning material.

7. A subsurface dune protection system as described in claim 1 wherein said toe scour tube has a layer of geotextile shield material secured thereover.

8. A subsurface dune protection system as described in claim 1 wherein said geotextile container further comprises wide curved ends reducing wave turbulence to a minimum preventing damage to adjoining properties.

9. A subsurface dune protection system as described in claim 1 wherein injection ports and relief ports are strategically located in said cell upper sloping walls, said injection ports capable of receiving conventional pipe fittings for filling said cells.

10. A subsurface dune protection system as described in claim 9 wherein patches of geotextile material are cemented over said injection and said relief ports in said sloping walls upon completion of the cell filling operation.

11. A subsurface dune protection system as described in claim 9 wherein said manifold is formed by securing a strip of material to the inner side of said cell upper sloping surfaces.

12. A subsurface dune protection system as described in claim 1 wherein all the seams in the materials forming the geotextile container are designed to receive seam separating forces in shear resistance.

13. A subsurface dune protection system as described in claim 1 wherein a cell upper surface wall and an internal divider wall joint includes said shielding layers being welded to said upper sloping walls, a lateral tab on said internal divider wall welded to the inner surface of said upper sloping wall, a reinforcing strip of geotextile material bent to include a vertical tab and a horizontal tab, said vertical tab welded to said internal divider wall, and said horizontal tab welded to an inner surface of said upper sloping wall.

14. A subsurface dune protection system as described in claim 1 further comprising a fluid conducting manifold in each cell, an injection port in each cell upper sloping surface in fluid communication with said manifold, and a plurality of holes of a predetermined size and spacing in said manifold discharging fluid into said cells as desired.

15. A subsurface dune protection system as described in claim 1 further comprising a mattress assembly for placement at abutment joints when two containers are abutted together for providing protection for extensive dune lengths.

16. A subsurface dune protection system as described in claim 15 wherein said mattress assembly comprises two layers of geotextile material heat welded together at seams providing a tubular member around three sides of the assembly in the form of a U-shaped compartment, a flat base portion of said two layers surrounded by said U-shaped container, the base of said U-shaped container being positioned parallel to said cells, the sides of said U-shaped extending landward from said base, and said sides each having an opening at the landward end for filling the U-shaped container with sand providing a compact tubular ridge around the three sides of said container, the base ridge fitting adjacent and immediately behind abutting toe scour tubes of abutting inflatable wedge-shaped geotextile containers, the sides of said mattress U-shaped container supporting respective abutting cells in joined wedge-shaped containers.

* * * * *